US008569648B2

(12) United States Patent
Chen et al.

(10) Patent No.: US 8,569,648 B2
(45) Date of Patent: Oct. 29, 2013

(54) APPARATUS AND SYSTEM FOR IMPROVING DEPTH OF FOCUS

(75) Inventors: Chun-Ming Chen, Hualien County (TW); Sung-Ho Liu, Kaohsiung (TW); Jie-Ting Tseng, Tainan (TW); Min-Kai Lee, Tainan County (TW); Ying-Hui Yang, Kaohsiung County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 287 days.

(21) Appl. No.: 12/966,501

(22) Filed: Dec. 13, 2010

(65) Prior Publication Data

US 2012/0125901 A1   May 24, 2012

(30) Foreign Application Priority Data

Nov. 18, 2010   (TW) .............................. 99139679 A

(51) Int. Cl.
  *B23K 26/14*   (2006.01)
  *B23K 26/08*   (2006.01)
(52) U.S. Cl.
  USPC .............................. 219/121.67; 219/121.78
(58) Field of Classification Search
  USPC ........................................ 219/121.6–121.83
  See application file for complete search history.

(56) References Cited

U.S. PATENT DOCUMENTS

| 3,896,304 | A  | * | 7/1975 | Aoki et al. ................. 250/201.7 |
| 5,260,562 | A  | * | 11/1993 | Bearden et al. ............... 250/216 |
| 5,896,223 | A  |   | 4/1999 | Tigliev et al. |
| 6,676,878 | B2 | * | 1/2004 | O'Brien et al. ............... 264/400 |
| 6,706,998 | B2 |   | 3/2004 | Cutler |
| 7,498,238 | B2 |   | 3/2009 | Tamura |
| 2005/0199598 | A1 | * | 9/2005 | Hunter et al. ............ 219/121.72 |

FOREIGN PATENT DOCUMENTS

WO   WO-2007/108589 A1   9/2007

OTHER PUBLICATIONS

B.Tan et al., "Dual-focus laser micro-machining", Journal of Modern Optics, vol. 52, No. 17, Nov. 20, 2005, 2603-2611.
Taiwan Patent Office, Office Action, Patent Application Serial No. TW099139679, Jul. 15, 2013, Taiwan.

* cited by examiner

*Primary Examiner* — Sang Paik
(74) *Attorney, Agent, or Firm* — Rabin & Berdo, P.C.

(57) ABSTRACT

The present invention provides an apparatus and a system for improving depth of focus (DOF), wherein an optical lens for optical processing is actuated to vibrate whereby the DOF of the optical processing is increased due to the variation of focal point. In the embodiment of the present invention, an actuator is coupled to the optical lens for providing vibration energy wherein the optical lens is actuated by the vibration energy so as to vibrate on an optical axis thereof so as to increase the DOF during the optical processing, thereby improving the quality and efficiency of optical processing.

13 Claims, 6 Drawing Sheets

APPARATUS AND SYSTEM FOR IMPROVING DEPTH OF FOCUS

TECHNICAL FIELD

The present disclosure relates to an optical apparatus and system, and more particularly, to an optical apparatus and system for improving depth of focus.

TECHNICAL BACKGROUND

Clearly, the depth of focus (DOF) and spot size of a laser machining process is determined by the focal length of its optical module, the wavelength of the laser beam, input beam size, and so on. Since the DOF of an optical device for a laser machining process is usually proportional to the spot size of the laser machining process, i.e. when a high precision laser machining is performed using a small spot size, the DOF of the optical module for the laser machining is usually very small. Nevertheless, in a laser machining process performed under the restriction of a very small DOF, any careless operation for moving a mobile component in the laser machining platform or even a slight deflect to the flatness of the film to be machined can cause the machining to excess the range of the DOF, causing the machining quality to drop significantly. For instance, in a laser machining process using ultraviolet laser working in conjunction with an objective lens module, the resulting spot size is about 5 um and the DOF is ranged between 15 um~20 nm.

There are already many studies for solving the aforesaid problem. One of which is an apparatus for laser machining process, disclosed in U.S. Pat. No. 6,706,998, entitled "Simulated Laser Spot Enlargement", in which the apparatus employs an fast steering mirror in the beam path to continuously move the laser beam in a high speed prescribed pattern about a nominal target position to spatially separate the focused laser spots generated at a high laser repetition rate and thereby create geometric features having dimensions greater than those of the focused laser spot, and thereby, permits a series of laser pulses at a given repetition rate to appear as a series of larger diameter pulses at a lower pulse rate without the beam quality problems associated with working out of focus, i.e. the laser spot size can be enlarged effectively for increase the area that can be treated within a specific period of time. Moreover, another such study is an apparatus for laser machining process, disclosed in U.S. Pat. No. 7,498,238, entitled "Chip and Method for Dicing Wafer into Chips", in which a laser head composed of a laser beam source and a condenser lens module is mounted on a vertical machining platform for enabling the same to be displaced up and down in a vertical direction of a wafer, and thereby the DOF range of the laser machining apparatus can be increased for facilitating the dicing of the wafer. In addition, there is an adjustable laser beam delivery system and method for forming the same disclosed in WO/2007/108589, in which the width and length of a focused laser spot can be adjusted and varied along with the varying of a distance associated with a convex lens in a lateral direction and in a vertical direction. Furthermore, a dual-focus micro-machining method is disclosed in Journal of Modern Optics, November 2005, pp. 2603-2611(9), by B. Tan and K. Venkatakrishnan, in which an optical configuration of plate beam splitter, convex mirror and focusing lens is provided for generating dual-focus from a single laser incident beam, and thereby the generated two foci have nearly equivalent spot size and both fall on the optical axis of the focusing optics, but at different focal lengths. The dual-focus optics allows for variations of the laser power of each focal point and the distance between the two focal points. The advantages of dual-focus ablation were demonstrated with a nanosecond UV laser dicing silicon substrates.

TECHNICAL SUMMARY

The present disclosure provides an optical apparatus and system for improving depth of focus (DOF), capable of enabling an actuator to vibrate while transmitting the vibration to an optical lens module coupled to the actuator for causing a vibration to be caused on the optical axis of the optical lens module, and thus increasing the DOF for an optical processing. Thereby, problems associated with working out of focus under the restriction of a very small DOF can be prevented, and the quality and efficiency of the optical processing can be enhanced.

The present disclosure further provides an optical apparatus and system for improving depth of focus (DOF), capable of enabling an actuator to vibrate while transmitting the vibration to an optical lens module coupled to the actuator, and thereby, with the design of the optical lens module that is configured with converging lenses and diverging lenses, the vibrating amplitude on the optical axis of the optical lens module is amplified for enabling the DOF for an optical process to be increased by factors, and thus causing the quality and efficiency of the optical processing to be enhanced.

In an embodiment, the present disclosure provides an optical apparatus for improving depth of focus (DOF), comprising: an optical lens module; and an actuator, coupled to the optical lens module; wherein, the actuator is actuated by a driving signal for issuing a vibration frequency to the optical lens module for controlling the same to vibrate on the optical axis of the optical lens module.

In another embodiment, the present disclosure provides an optical system for improving depth of focus (DOF), comprising: a light source, for emitting a beam to be used in a machining process; an optical lens module; for focusing the beam; and an actuator, coupled to the optical lens module; wherein, the actuator is actuated by a driving signal for issuing a vibration frequency to the optical lens module for controlling the same to vibrate in a specific vibration frequency on the optical axis of the optical lens module, causing the focus position of the beam to varying accordingly, and thus, causing the DOF of the optical system to increase.

In further another embodiment of the present disclosure, the optical lens module further comprises: a diverging lens unit, coupled to the actuator for enabling the same to receive the driving signal to be used for causing the same to vibrate on the optical axis of the optical lens module; and a condensing lens unit, disposed spacing from the diverging lens unit by a distance so as to used for focusing the beam projected thereon after passing through the diverging lens unit. Moreover, in another embodiment of the present disclosure, the optical lens module further comprises: a diverging lens unit; and a condensing lens unit, disposed spacing from the diverging lens unit by a distance for focusing the beam projected thereon after passing through the diverging lens unit, while being coupled to the actuator for enabling the same to receive the driving signal to be used for causing the same to vibrate on the optical axis of the optical lens module.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
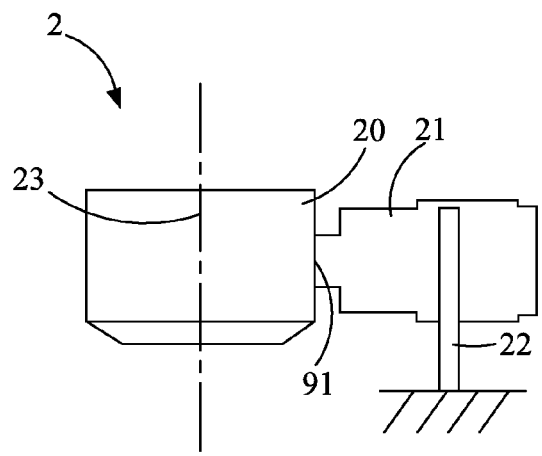
FIG. 1 is a schematic diagram showing an optical apparatus for improving DOF according to an embodiment of the present disclosure.

Please refer to FIG. 1 is a schematic diagram showing an optical apparatus for improving DOF according to an embodiment of the present disclosure. In this embodiment, the optical apparatus 2 is composed of: an optical lens module 21 and an actuator 21 in a manner that the actuator 22 is coupled to the optical lens module 20 and can be a piezoelectric vibrator, but is not limited thereby. Moreover, the optical lens module is configured with a holding device 22 for holding the actuator 21. Thereby, the actuator 21 can be is actuated by a driving signal for issuing a vibration frequency to the optical lens module 20 for controlling the same to vibrate on the optical axis 23 of the optical lens module 20, and consequently, changing the focal position of the optical lens module 20. It is noted that the driving signal can substantially be a kind of voltage signal with a waveform of square wave or sine wave, etc., and the vibration frequency is ranged between 1 Hz and 100 MHz.

Figure 2:
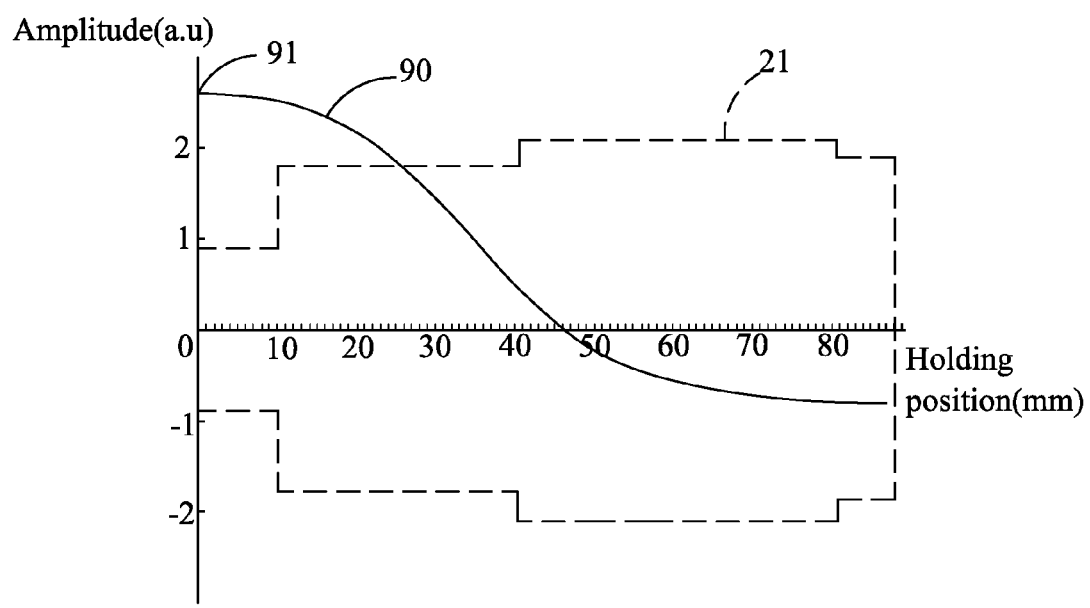
FIG. 2 is a graph illustrating the relationship between the vibration amplitude of an actuator and the position at which the actuator is being held.

Please refer to FIG. 2, which is a graph illustrating the relationship between the vibration amplitude of an actuator and the position at which the actuator is being held. When the actuator 21 is driven by the driving signal to vibrate in the vibration frequency, its vibration amplitude will vary with the variation of position at which the actuator 21 is being held by the holding device 22. For identifying a holding position for the actuator 21 that is capable of enabling as many energy of the vibration from the vibrating actuator 21 to be transmitted to the optical lens module 20 as possible when the actuator 21 is being held thereat by the holding device 22 so as to enable a maximum displacement in the optical lens module 20, a plurality of experiments is taken for determining the relationship between the vibration amplitude of an actuator and the position at which the actuator is being held, as shown in FIG. 2. Thereafter, as soon as the holding position of the actuator 21 relating to the maximum amplitude is identified, the actuator 21 can be held by the holding device 22 at the identified holding position so as to be coupled to the optical lens module 20. Thereby, the optical lens module 20 can be certain to have a significant displacement resulting from the vibration of the actuator 21. As shown in FIG. 2, the curve 90 profiles the relationship between the vibration amplitude of an actuator 21 and the position at which the actuator is being held, and therefrom, the holding position of the actuator 21 that is related to the maximum amplitude is identified to the end 91 of the actuator 21. Therefore, when the actuator 21 is held by the holding device 22 at the end 91 thereof, the displacement induced in the optical lens module 20 by the vibrating actuator 21 is maximized.

Figure 3A:
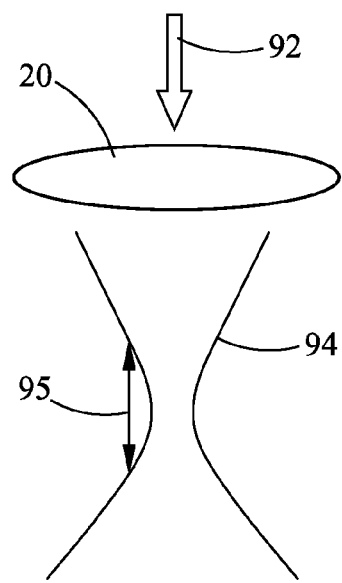
FIG. 3A is a schematic diagram showing the DOF range of the optical lens module without being induced to vibrate according to the present disclosure.
Figure 3B:
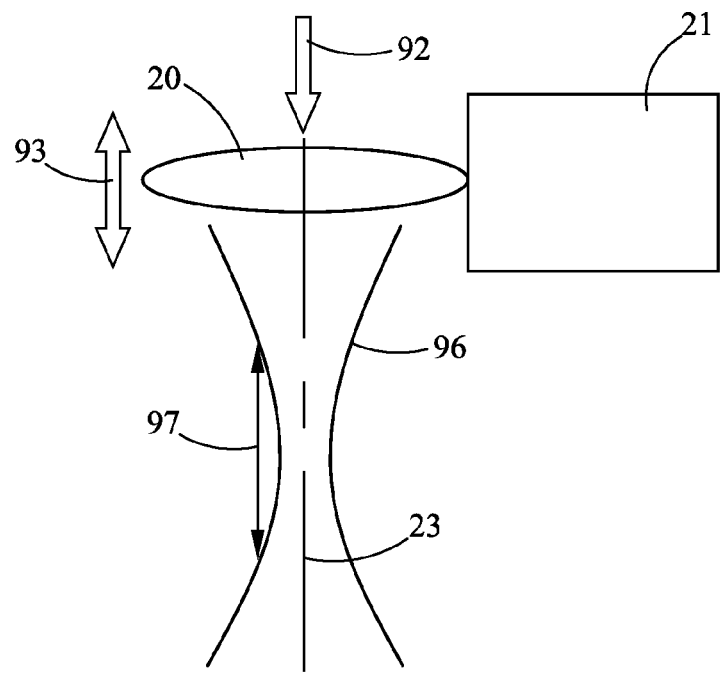
FIG. 3B is a schematic diagram showing the DOF range of the optical lens module when it is being induced to vibrate according to the present disclosure.

Please refer to FIG. 3A and FIG. 3B, which are a schematic diagram showing the DOF range of the optical lens module without being induced to vibrate according to the present disclosure, and a schematic diagram showing the DOF range of the optical lens module when it is being induced to vibrate according to the present disclosure. As shown in FIG. 3A, in a condition that the incident beam 92 is projected and travels passing through the optical lens module 20 that is motionless, the focused beam 94 resulting from the focusing of the optical lens module 20 will generate a DOF range 95, as shown in FIG. 3A. On the other hand, in a condition that the actuator 21 is driven by a driving signal to vibrate in a vibration frequency while transmitting the energy of the vibration to the optical lens module 20 as the optical lens module 20 is coupled to the vibrating actuator 21, the optical lens module 20 will be induced to vibrate on its optical axis 23, and thus the focal position of the focus beam 96 resulting from the focusing of the optical lens module 20 will be varied according, causing a DOF range 97 to be generated, as shown in FIG. 3B. Comparing the two DOF ranges 95, 97, it is noted that the focused beam 96 will obvious achieve a better laser machining effect since the DOF 97 resulting therefrom is larger than the DOF 95 resulting from the motionless optical lens module 20.

In the embodiment shown in FIG. 1, the optical lens module 20 can be a diffractive lens module or a refractive lens module. However, as the structures of the diffractive lens module and the refractive lens module are known to those skilled in the art, they will not be described further herein. Please refer to FIG. 4, which is a schematic diagram showing an optical lens module according to an embodiment of the present disclosure. In this embodiment, the optical lens module 20, being a refractive lens module, is composed of a diverging lens unit 201 and a condensing lens unit 202. The diverging lens unit 201 can be formed from a single diverging lens, or can be lens set composed of at least one diverging lens, whereas the diverging lens used in the diverging lens unit 201 should be a lens configured with at least one concave surface. In this embodiment, the diverging lens unit 201 is formed from a single diverging lens that can a biconcave lens or a plano-concave lens, but is not limited thereby. Moreover, the condensing lens unit 202 is disposed spacing from the diverging lens unit 201 by a distance so as to be used for focusing the beam travelling passing through the diverging lens unit 201 and then projected thereon. Similarly, the condensing lens unit 202 can be formed from a single condensing lens, or can be lens set composed of at least one condensing lens, whereas the condensing lens used in the condensing lens unit 202 should be a lens configured with at least one convex surface. In this embodiment, the condensing lens unit 202 is formed from a single condensing lens that can a biconvex lens or a plano-convex lens, but is not limited thereby.

Figure 4:
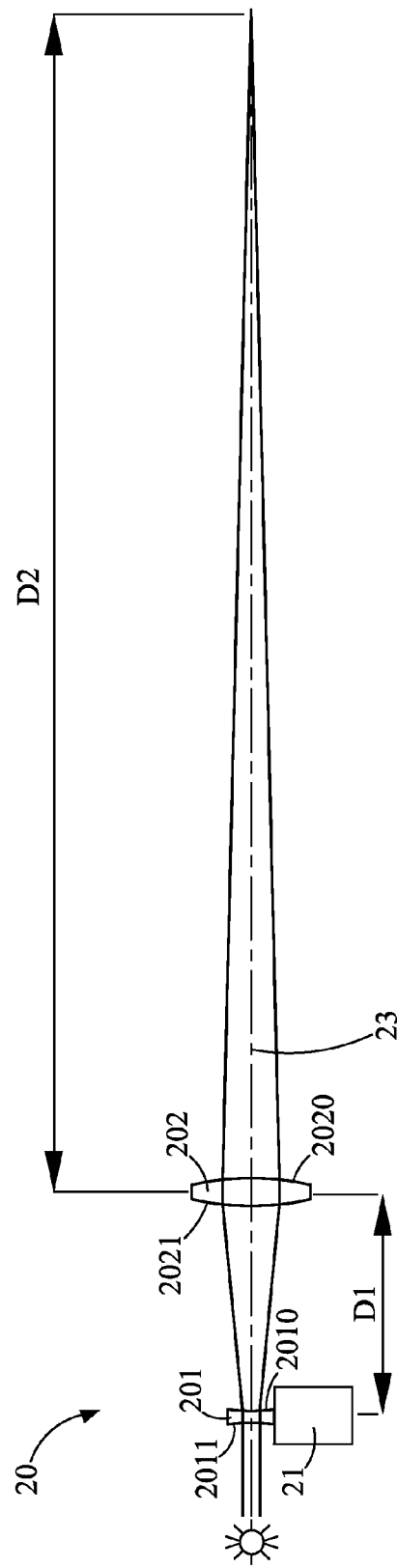
FIG. 4 is a schematic diagram showing an optical lens module according to an embodiment of the present disclosure.

In the embodiment shown in FIG. 4, the actuator 21 is coupled only to the diverging lens unit 201 for enabling the condensing lens unit 202 to be maintained motionless, and thereby, when the diverging lens unit 201 is induced to vibrated by the vibration energy transmitted from the vibrating actuator 21, the vibrating amplitude on the optical axis of the optical lens module 20 is amplified for enabling the DOF resulting from the condensing lens unit 202 to vary dramatically, and thus causing the DOF range of the optical lens module 20 be increased by factors.

In an embodiment, the following conditions are assumed:
1. the spot size is 3.5 mm and the wavelength of the incident beam is 355 nm;
2. the concave surfaces 2010 and 2011 of the diverging lens unit 201, formed in a thickness of 2 mm, are formed in a radius of 20 mm and in a thickness of 2 mm, whereas the diverging lens unit 201 is made of a silicate glass (N-BK7);
3. the condensing lens unit 202, formed in a thickness of 6 mm, is configured with a convex surface 2020 in a radius of 50 mm and a convex surface 2021 in a radius of 60 mm, whereas the condensing lens unit 202 is also made of a silicate glass (N-BK7).

Operating under the aforesaid conditions and defining the vibration amplitude of the actuator 21 is 10 um while maintaining the spot size unchanged, the effective focal length is varying within a range of 150 um in length whereas the induced DOF range is about 10 times the vibration amplitude of the actuator 21.

Figure 5:
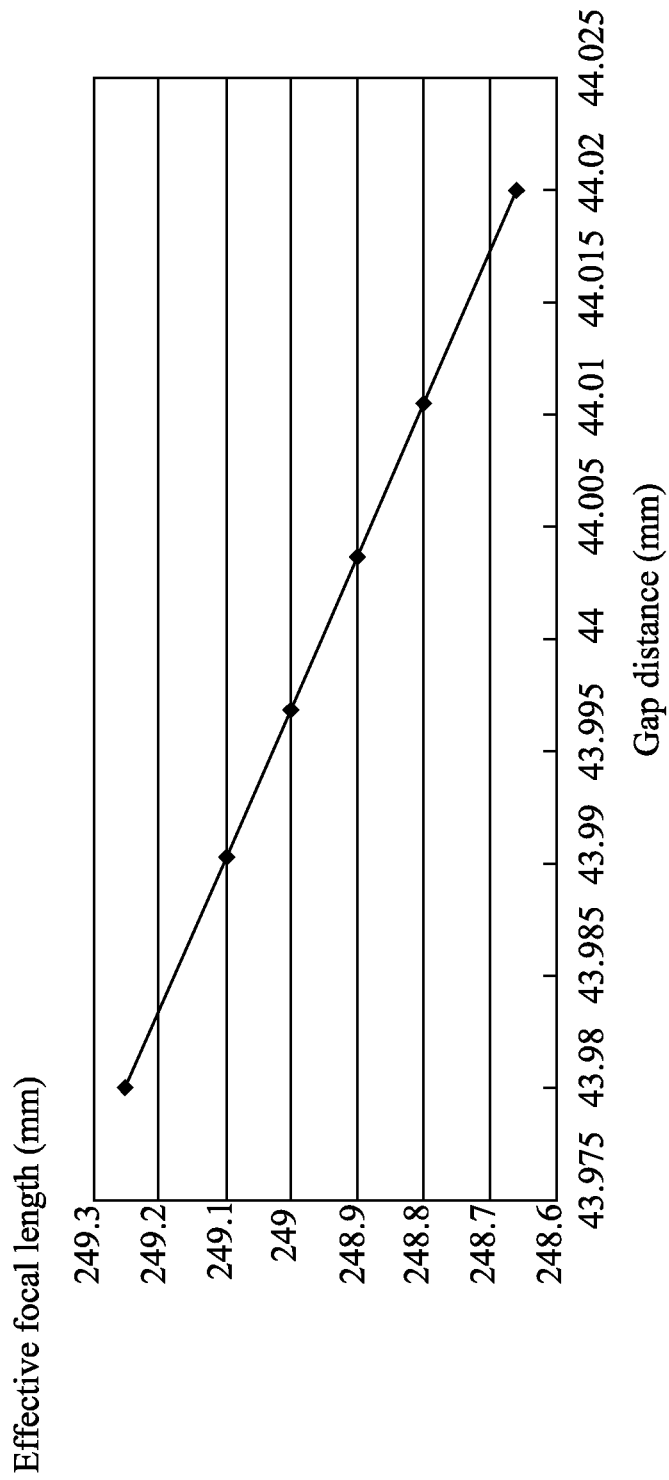
FIG. 5 is a graph profiling the relationship between the gap distance of the optical lens module and the effective focal length according to the present disclosure.
Figure 6:
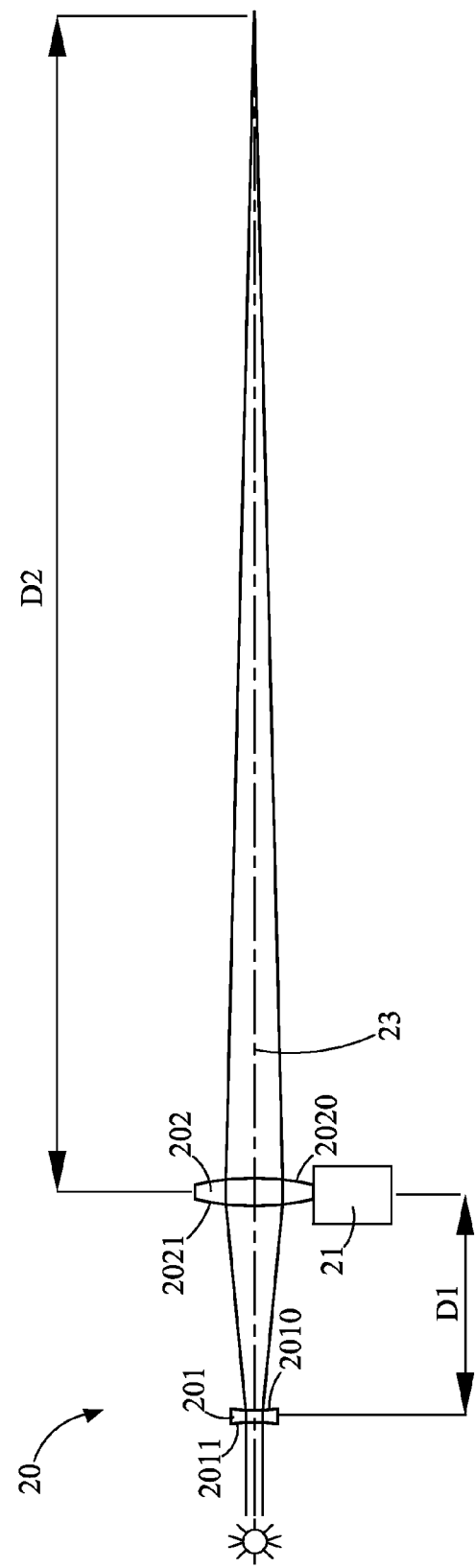
FIG. 6 is a schematic diagram showing an optical lens module according to another embodiment of the present disclosure.

Please refer to FIG. 5, which is a graph profiling the relationship between the gap distance of the optical lens module of FIG. 4 and the effective focal length according to the present disclosure. It is noted that the gap distance is the distance D1 measured between the diverging lens unit 201 and the condensing lens unit 202 in the optical lens module 20 of FIG. 4, and the effective focal length is the distance D2 measured between the condensing lens unit 20 and the its resulting focal position. As shown in FIG. 5, the gap distance D1 is linearly proportional to the effective focal length D2, so that it is possible to obtain a required effective focal length D2 simply by adjusting the gap distance D1. In addition, although the actuator 21 is coupled to the diverging lens unit 201 in the embodiment shown in FIG. 4 for causing the same to vibration on the optical axis, the actuator can be coupled to the condensing lens unit 202 instead of the diverging lens unit 201, as shown in FIG. 6.

Figure 7:
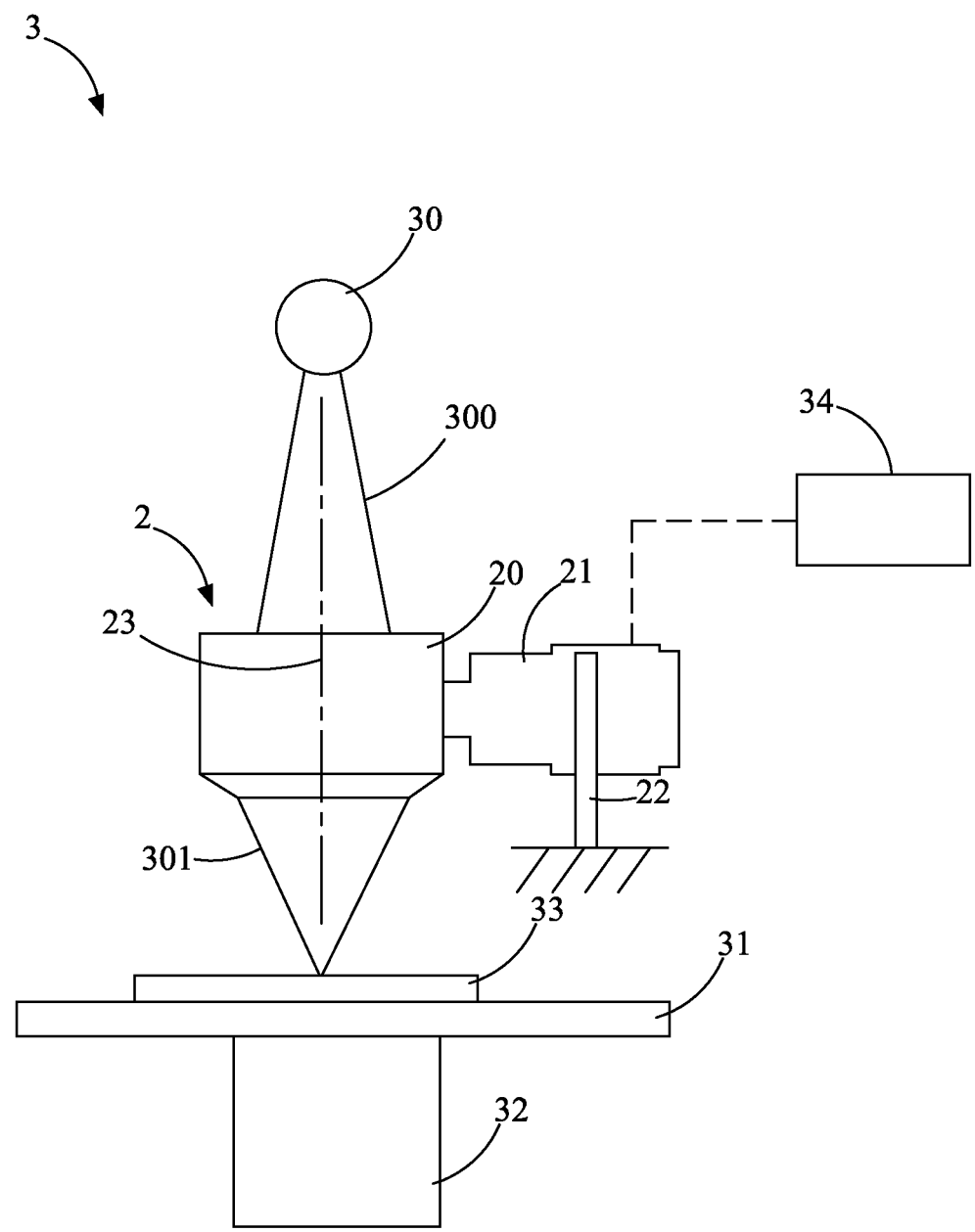
FIG. 7 is a schematic diagram showing an optical system for improving DOF according to an embodiment of the present disclosure.

Please refer to FIG. 7, which is a schematic diagram showing an optical system for improving DOF according to an embodiment of the present disclosure. In this embodiment, the optical apparatus 2 of FIG. 1 is integrated with a machining platform so as to construct an optical system 3 for improving DOF. As shown in FIG. 7, the optical system 3 comprises an optical apparatus 2, a light source 30 and a machining platform 31, in which the optical apparatus 2 is constructed the same as the one shown in FIG. 1, and thus is not described further herein. The light source 30 is used for emitting a beam 300 to be used in a machining process, whereas the wavelength of the beam 300 is ranged between 100 nm and 20 μm. In this embodiment, the light source 30 is substantially a laser light source, but is not limited thereby. Moreover, the machining platform 31, being disposed at a side of the optical apparatus 2, is used for carrying a substrate 33, whereas the substrate 33 can be a wafer or a glass substrate, etc., but is not limited thereby. Furthermore, the machining platform 31 has a layer of film formed on its surface, whereas the film layer can be a photoresist layer, an oxidation material layer, or a metal layer, etc., but is not limited thereby. The machining platform 31 is further coupled to a driving device 31, that is provided for powering and thus driving the machining platform 31 to rotation as well as to perform a linear displacement of at least one degree-of-freedom according to a control signal. In this embodiment, the machining platform 31 is enabled to perform a four-dimensional displacement and rotate as well. It is noted that the driving device 32 can be an assembly of motors, screw rods, linear guide rails, and so on, but since it is known to those skilled in the art, it is not described further herein.

In the conditions for machining patterns of tiny line width, for machining a structure with large aspect ratio on a thick substrate, or for machining micro-holes/micro-channels, it is preferred to have larger DOF range for preventing problems associated with working out of focus from happening. Thus, in the present disclosure, by enabling a control unit 34 to issue a driving signal for controlling the actuator 21 to vibrate while enabling the energy of the vibration to be transmitted to the optical lens module 20, the focal position of the optical lens module 20 will be varied with the vibration frequency of the optical lens module 20, and consequently, the DOF range of the optical lens module 20 with respect to the focus beam 301 is increased. The driving signal is a voltage signal with a frequency ranged between 1 Hz and 100 MHz. Moreover, for enhancing machining efficiency, the optical lens module 20 used in the optical system 3 can be configured as the one shown in FIG. 4 or FIG. 6 since the DOF range can be increased by factors thereby.

To sum up, the problem associate with working out of focus, i.e. in a condition described as following: "when a high precision laser machining is performed using a small spot size, the DOF of the optical module for the laser machining is usually very small, and thus, under the restriction of a very small DOF, any careless operation for moving a mobile component in the laser machining platform or even a slight deflect to the flatness of the film to be machined can cause the machining to excess the range of the DOF, causing the machining quality to drop significantly", can be solved, since the DOF range of the optical lens module can be increased effectively by the vibration of the same.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:
1. An optical apparatus for improving a depth of focus (DOF) thereof, comprising:
an optical lens module; and
an actuator, coupled to the optical lens module;
wherein the actuator is actuated by a driving signal, from a control unit, for issuing a vibration frequency to the optical lens module for controlling the same to vibrate on an optical axis of the optical lens module,
wherein the optical lens module is a refractive lens module that comprises:

a diverging lens unit coupled to the actuator for enabling the actuator, based upon the driving signal, to cause the diverging lens unit to vibrate on the optical axis of the optical lens module to increase the DOF; and a condensing lens unit disposed apart from the diverging lens unit by a distance so as to be used for focusing a beam that passes through the diverging lens unit and then projected onto the condensing lens unit.

2. The optical apparatus of claim 1, wherein the diverging lens unit is configured with at least one concave surface, while the condensing lens unit is configured with at least one convex surface.

3. The optical apparatus of claim 1, wherein the vibration frequency is in a range between 1 Hz and 100 MHz.

4. The optical apparatus of claim 1, wherein the actuator is coupled to the optical lens module by an end thereof, while the actuator is further coupled to the control unit, provided for generating the driving signal for controlling the actuator.

5. An optical system for improving depth of focus (DOF) thereof, comprising:

a light source for emitting a beam to be used in a machining process;

an optical lens module for focusing the beam;

an actuator coupled to the optical lens module, wherein the actuator is actuated by a driving signal for issuing a vibration frequency to the optical lens module for controlling the same to vibrate in a specific vibration frequency on an optical axis of the optical lens module, causing the focus position of the beam to vary accordingly, and thus, causing the DOF of the optical system to increase; and a control unit that is for generating the driving signal for controlling the actuator, wherein the optical lens module is a refractive lens module that comprises:

a diverging lens unit coupled to the actuator for enabling the actuator, based upon the driving signal, to cause the diverging lens unit to vibrate on the optical axis of the optical lens module to increase the DOF, the beam from the light source passing through the diverging lens unit; and a condensing lens unit disposed apart from the diverging lens unit so as to be used for focusing the beam from the light source that passes through the diverging lens unit and that is then projected onto the condensing lens unit.

6. The optical system of claim 5, wherein the diverging lens unit includes at least one diverging lens, each being configured with at least one concave surface, while the condensing lens unit includes at least one condensing lens, each being configured with at least one convex surface.

7. The optical system of claim 5, wherein the vibration frequency is in a range between 1 Hz and 100 MHz.

8. The optical system of claim 5, wherein the actuator is coupled to the optical lens module by an end thereof, while the actuator is further coupled to the control unit.

9. The optical system of claim 5, wherein the wavelength of the beam used in the machining process is in a range between 100 nm and 20 μm.

10. The optical system of claim 5, wherein the light source is substantially a laser light source.

11. The optical system of claim 5, further comprising:

a machining platform for carrying a substrate while allowing the beam to focus on the substrate for machining the substrate.

12. The optical system of claim 11, further comprising a driving device provided for powering and thus driving the machining platform, wherein the machining platform is further coupled to the driving device.

13. The optical system of claim 5, being configured for enabling the distance between the diverging lens unit and the condensing lens unit to be adjustable for enabling a focal length of the condensing lens unit to vary accordingly.

* * * * *